US012756549B2

(12) United States Patent
Kii

(10) Patent No.: US 12,756,549 B2
(45) Date of Patent: Oct. 6, 2026

(54) SECRET NOISE GENERATION SYSTEM, SECRET NOISE GENERATION METHOD AND PROGRAM

(71) Applicant: NTT, Inc., Tokyo (JP)

(72) Inventor: Masanobu Kii, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/872,503

(22) PCT Filed: Jul. 11, 2022

(86) PCT No.: PCT/JP2022/027289
§ 371 (c)(1),
(2) Date: Dec. 6, 2024

(87) PCT Pub. No.: WO2024/013814
PCT Pub. Date: Jan. 18, 2024

(65) Prior Publication Data
US 2025/0373420 A1 Dec. 4, 2025

(51) Int. Cl.
*H04L 9/08* (2006.01)

(52) U.S. Cl.
CPC ........ *H04L 9/0869* (2013.01); *H04L 2209/08* (2013.01); *H04L 2209/46* (2013.01)

(58) Field of Classification Search
CPC ..... H04L 9/0869; H04L 9/008; H04L 9/0838; H04L 9/0866; H04L 9/0894; H04L 9/085; H04L 9/0618; G06F 21/62; G09C 1/00
See application file for complete search history.

(56) References Cited

U.S. PATENT DOCUMENTS

| | | | | |
|---|---|---|---|---|
| 8,756,410 | B2 * | 6/2014 | Raykova | H04L 9/008 713/150 |
| 9,525,551 | B1 * | 12/2016 | Ackerman | H04L 9/3228 |
| 9,536,114 | B1 * | 1/2017 | El Defrawy | H04L 63/04 |
| 10,528,760 | B2 * | 1/2020 | Cho | G06F 16/29 |
| 10,805,079 | B2 * | 10/2020 | Lu | H04L 9/0863 |
| 11,341,269 | B2 * | 5/2022 | Veugen | H04L 9/008 |
| 11,502,829 | B2 * | 11/2022 | Yanai | H04L 9/085 |
| 11,538,467 | B1 * | 12/2022 | Feyisetan | G10L 15/1815 |
| 11,818,255 | B2 * | 11/2023 | Veeningen | H04L 9/3242 |
| 11,989,325 | B1 * | 5/2024 | Du | G06F 21/6254 |
| 12,333,039 | B2 * | 6/2025 | Ichikawa | H04L 9/0894 |
| 12,536,161 | B2 * | 1/2026 | Raghuraman | G06F 16/244 |

(Continued)

OTHER PUBLICATIONS

Froelicher, David, et al. "Unlynx: a decentralized system for privacy-conscious data sharing." Proceedings on Privacy Enhancing Technologies (2017).*

(Continued)

*Primary Examiner* — David Garcia Cervetti
(74) *Attorney, Agent, or Firm* — IPUSA, PLLC

(57) ABSTRACT

A secret noise generation system according to one aspect of the present disclosure includes: a first terminal; and one or more second terminals, wherein the first terminal includes a transmission unit configured to transmit a first table having secret values as elements to each of the second terminals, and each of the second terminals includes a noise calculation unit configured to calculate a sum of n secret values selected from the first table as a secret noise by using secure computation that allows addition of secret values, where n is an integer not less than 2.

7 Claims, 4 Drawing Sheets

(56) References Cited

U.S. PATENT DOCUMENTS

| | | | | |
|---|---|---|---|---|
| 12,536,213 | B2 * | 1/2026 | Crabtree | G06F 16/3347 |
| 12,652,330 | B2 * | 6/2026 | Shribman | H04L 67/02 |
| 2005/0152538 | A1 * | 7/2005 | Stedron | G09C 1/02<br>380/28 |
| 2008/0040603 | A1 * | 2/2008 | Stedron | H04L 9/065<br>380/28 |
| 2016/0004874 | A1 * | 1/2016 | Ioannidis | H04L 9/302<br>713/165 |
| 2017/0046520 | A1 * | 2/2017 | Ohrimenko | G06F 9/5066 |
| 2019/0272388 | A1 * | 9/2019 | Tsou | G06F 21/6254 |
| 2020/0082290 | A1 * | 3/2020 | Pascale | G06N 20/00 |
| 2020/0279054 | A1 * | 9/2020 | Pihur | G06F 17/18 |
| 2021/0226924 | A1 * | 7/2021 | Yanai | H04L 63/0421 |
| 2021/0243171 | A1 * | 8/2021 | Ghazi | G06N 5/04 |
| 2021/0359846 | A1 * | 11/2021 | Wright | G06F 16/2379 |
| 2021/0374605 | A1 * | 12/2021 | Qian | G06N 20/00 |
| 2022/0247548 | A1 * | 8/2022 | Boehler | H04L 9/00 |
| 2022/0247551 | A1 * | 8/2022 | Joye | H04L 9/008 |
| 2022/0374542 | A1 * | 11/2022 | Ghazi | G06F 21/6254 |
| 2022/0382908 | A1 * | 12/2022 | Buddhavarapu | G06F 21/6263 |
| 2023/0101710 | A1 * | 3/2023 | Ikarashi | H04L 9/085<br>713/189 |
| 2023/0327850 | A1 * | 10/2023 | Ghazi | H04L 9/14<br>713/193 |
| 2024/0104228 | A1 * | 3/2024 | Clegg | H04L 9/085 |
| 2024/0152643 | A1 * | 5/2024 | Du | G06N 20/20 |
| 2024/0256899 | A1 * | 8/2024 | He | G06N 3/098 |
| 2024/0394597 | A1 * | 11/2024 | Marathe | G06N 20/00 |
| 2024/0404253 | A1 * | 12/2024 | Raguram | G06V 10/776 |
| 2025/0013634 | A1 * | 1/2025 | Raghuraman | G06F 21/602 |
| 2025/0029724 | A1 * | 1/2025 | Chung | G16H 50/20 |
| 2025/0068658 | A1 * | 2/2025 | Xu | G06F 21/6245 |
| 2025/0077705 | A1 * | 3/2025 | Gong | G06F 21/6245 |
| 2025/0247205 | A1 * | 7/2025 | Lu | H04L 9/008 |
| 2026/0010288 | A1 * | 1/2026 | Cooper | G06F 3/0608 |

OTHER PUBLICATIONS

Becher, Kilian, and Thorsten Strufe. "Efficient cloud-based secret shuffling via homomorphic encryption." 2020 IEEE Symposium on Computers and Communications (ISCC). IEEE, 2020.*

Froelicher, David, et al. "Truly privacy-preserving federated analytics for precision medicine with multiparty homomorphic encryption." Nature communications 12.1 (2021): 5910.*

Movahedi, Mahnush, Jared Saia, and Mahdi Zamani. "Secure multi-party shuffling." International Colloquium on Structural Information and Communication Complexity. Cham: Springer International Publishing, 2015.*

Chase, Melissa, Esha Ghosh, and Oxana Poburinnaya. "Secret-shared shuffle." International conference on the theory and application of cryptology and information security. Cham: Springer International Publishing, 2020.*

Groth, Jens. "A verifiable secret shuffe of homomorphic encryptions." International Workshop on Public Key Cryptography. Berlin, Heidelberg: Springer Berlin Heidelberg, 2002.*

David Froelicher et al., "UnLynx: A Decentralized System for Privacy-Conscious Data Sharing", Proceedings on Privacy Enhancing Technologies 2017.4 (Oct. 1, 2017), pp. 232-250. ISSN: 2299-0984.

Kazuki Iwahana, Naoto Yanai, Toru Fujiwara, "Privacy-Preserving Collaborative Learning Based on Integration of Secure Computation and Differential Privacy", CSS 2020 Proceedings, Computer Security Symposium 2020, Oct. 2020, pp. 183-190.

Melissa Chase, Esha Ghosh, and Oxana Poburinnaya, "Secret Shared Shuffle", https://eprint.iacr.org/2019/1340, Nov. 22, 2019, 1340.2019, pp. 1-38.

* cited by examiner

SECRET NOISE GENERATION SYSTEM, SECRET NOISE GENERATION METHOD AND PROGRAM

TECHNICAL FIELD

The present disclosure relates to a secret noise generation system, a secret noise generation method, and a program.

BACKGROUND ART

Protocols for privacy, such as secure computation, generally protect information by adding noise (random numbers) to the data. The noise used at this time should be almost completely secured in order to protect the information. The only component about the noise that may be known to others is a probability distribution it follows, which is shared in advance among the protocol participants. Not only an exact value of the noise, but also partial information such as whether the noise is below a certain value must be kept secret.

In particular, there are attempts to generate noise that follows a non-uniform distribution under secure computation aiming to achieve the safety criterion of differential privacy. The noise should also be almost completely secured in this case. As related art for achieving this purpose, a uniform random number is generated by secure computation and then converted by table lookup to generate a noise that follows a target probability distribution (for example, NPL 1 and NPL 2).

CITATION LIST

Non-Patent Literature

NPL 1: David Froelicher et al., "UnLynx: A Decentralized System for Privacy-Conscious Data Sharing," In: Proceedings on Privacy Enhancing Technologies 2017.4 (Oct. 1, 2017), pp. 232-250. ISSN: 2299-0984

NPL 2: Kazuki Iwahana, Naoto Yanai, Toru Fujiwara, "Privacy-Preserving Collaborative Learning Based on Integration of Secure Computation and Differential Privacy," In: CSS 2020 Proceedings, Computer Security Symposium 2020 October 2020.

SUMMARY OF INVENTION

Technical Problem

However, the related art has challenges that it is generally necessary to use a huge table in order to approximate a desired probability distribution with sufficient accuracy, leading to increases in communication traffic and memory usage.

The present disclosure has been made in consideration of such challenges, and an object of the present disclosure is to provide a technology capable of creating a secret noise with lower communication traffic and memory usage.

Solution to Problem

A secret noise generation system according to one aspect of the present disclosure includes: a first terminal; and one or more second terminals, wherein the first terminal includes a transmission unit configured to transmit a first table having secret values as elements to each of the second terminals, and each of the second terminals includes a noise calculation unit configured to calculate a sum of n secret values selected from the first table as a secret noise by using secure computation that allows addition of secret values, where n is an integer not less than 2.

Advantageous Effects of Invention

It is possible to provide a technology capable of creating a secret noise with lower communication traffic and memory usage.

BRIEF DESCRIPTION OF DRAWINGS

FIG. 1 is a diagram illustrating one example of an overall configuration of a secret noise generation system according to the present embodiment.

FIG. 2 is a diagram illustrating one example of a hardware configuration of a participant terminal according to the present embodiment.

FIG. 3 is a diagram illustrating one example of a functional configuration of the participant terminal according to the present embodiment.

FIG. 4 is a sequence diagram illustrating one example of secret noise generation processing according to the present embodiment.

DESCRIPTION OF EMBODIMENTS

Hereinafter, one embodiment of the present invention will be described. In the following embodiment, a secret noise generation system 1 that can generate a secret noise with less communication traffic and memory usage will be described. The secret noise generation system 1 according to the present embodiment adopts secure computation that allows addition of secret values when generating a secret noise (for example, encrypted noise). Examples of such secure computation include additive homomorphic encryption and secure computation based on additive secret sharing. The present invention can adopt any secure computation as long as it allows addition of secret values. The following embodiment will be described mainly on the assumption that additive homomorphic encryption is used when generating a secret noise. A case in which a secure computation based on additive secret sharing is adopted will be described later as a modification of the present embodiment.

<Overall Configuration Example of Secret Noise Generation System 1>

Figure 1:
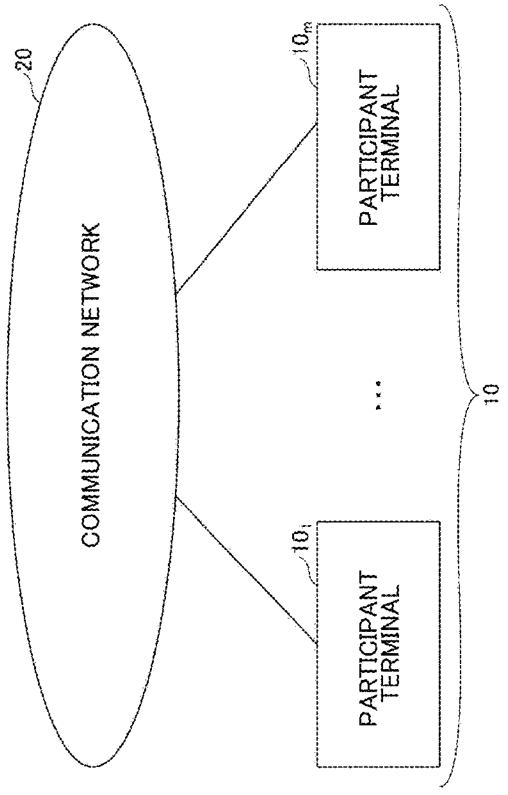
[FIG. 1]

FIG. 1 illustrates an overall configuration example of the secret noise generation system 1 according to the present embodiment. As shown in FIG. 1, the secret noise generation system 1 according to the present embodiment includes a plurality of participant terminals 10. Each of these participant terminals 10 is communicatively connected via a communication network 20 including the Internet or the like. In the example shown in FIG. 1, m participant terminals 10, a participant terminal $\mathbf{10}_1$, . . . , a participant terminal $\mathbf{10}_m$, are included. m is the number of participants in the protocol for secret noise generation.

The participant terminals 10 are various terminals, devices, or instruments (for example, personal computers (PCs), smartphones, tablet terminals, wearable devices, or general-purpose servers) used by participants.

The participants are roughly divided into a participant who creates a table T used for secret noise generation, and participants who generate a secret noise from this table T. Hereinafter, a participant who creates a table T used for secret noise generation will also be referred to as a "table creator," and each participant who generates a secret noise from the table T will also be referred to as a "noise generator." As one example, a participant terminal 10 used by the table creator is referred to as a "participant terminal $10_1$," and a participant terminal 10 used by each noise generator is referred to as a "participant terminal $10_i$ ($i \in \{2, \ldots, m\}$)."

The secret noise generation system 1 illustrated in FIG. 1 is merely one example, and the present invention is not limited thereto. For example, the secret noise generation system 1 may include, in addition to the participant terminals 10, a terminal, a device, or an instrument that executes some processing necessary for secret noise generation.

<Hardware Configuration Example of Participant Terminal 10>

Figure 2:
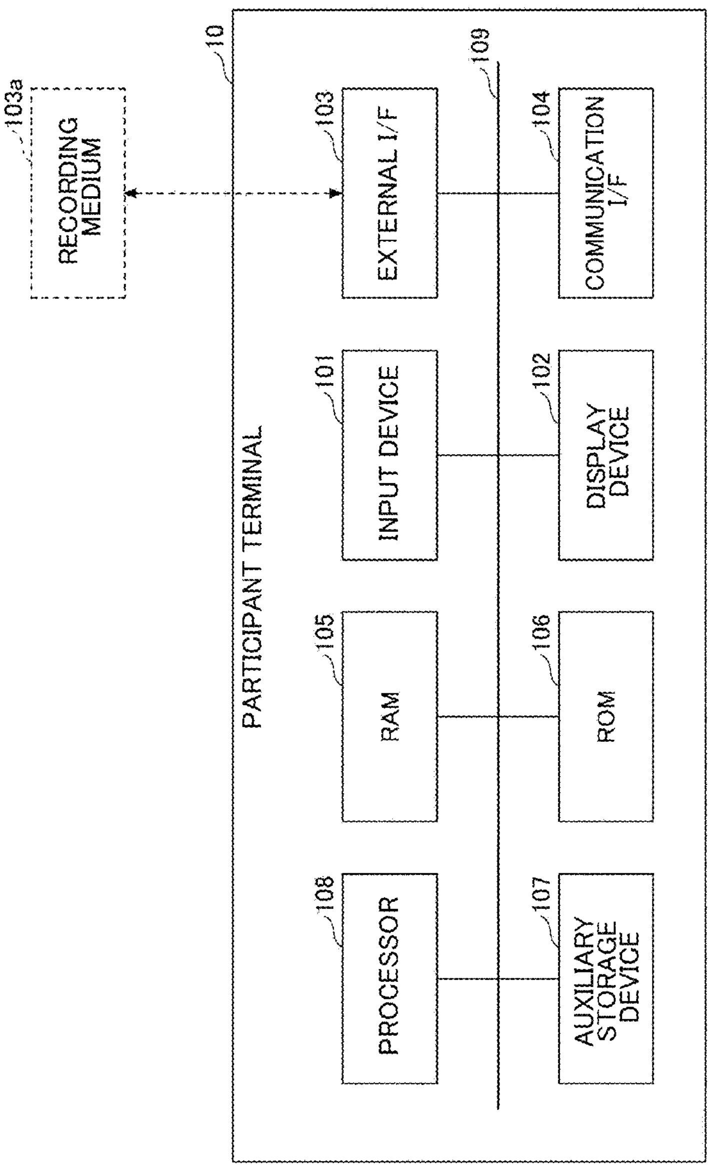
[FIG. 2]

FIG. 2 illustrates a hardware configuration example of a participant terminal 10 according to the present embodiment. As shown in FIG. 2, the participant terminal 10 according to the present embodiment includes an input device 101, a display device 102, an external I/F 103, a communication I/F 104, a random access memory (RAM) 105, a read only memory (ROM) 106, an auxiliary storage device 107, and a processor 108. These pieces of hardware are communicatively connected to each other via a bus 109.

The input device 101 is, for example, a keyboard, a mouse, a touchscreen, or physical buttons. The display device 102 is, for example, a display or a display panel. Further, for example, the participant terminal 10 need not include at least one of the input device 101 or the display device 102.

The external I/F 103 is an interface with external devices such as a recording medium **103*a*. The participant terminal 10 can perform reading and writing of the recording medium 103*a* via the external I/F 103. Examples of the recording medium 103*a*** include a flexible disk, a compact disc (CD), a digital versatile disk (DVD), a secure digital (SD) memory card, and a universal serial bus (USB) memory card.

The communication I/F 104 is an interface for connecting the participant terminal 10 to the communication network 20. The RAM 105 is a volatile semiconductor memory (storage device) which temporarily holds programs and data. The ROM 106 is a non-volatile semiconductor memory (storage device) which can retain programs and data even when the power is turned off. The auxiliary storage device 107 is, for example, a storage device such as a hard disk drive (HDD), a solid state drive (SSD), or a flash memory. The processor 108 is an arithmetic operation device such as a central processing unit (CPU).

With the hardware configuration illustrated in FIG. 2, the participant terminal 10 according to the present embodiment can implement secret noise generation processing to be described later. Note that the hardware configuration shown in FIG. 2 is a mere example and the hardware configuration of the participant terminal 10 is not limited thereto. For example, the participant terminal 10 may include a plurality of auxiliary storage devices 107 and/or a plurality of processors 108, need not include some of the illustrated hardware components, or may include various hardware components other than the illustrated hardware components.

<Functional Configuration Example of Participant Terminal 10>

Figure 3:
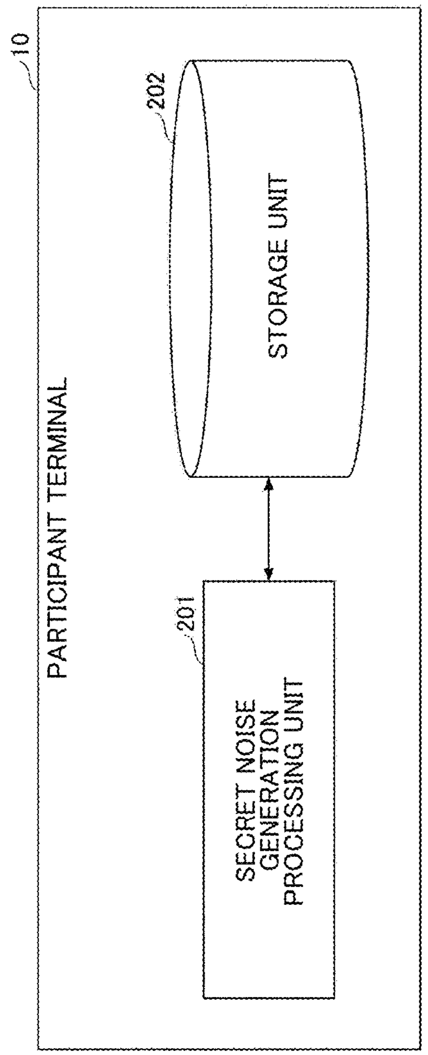
[FIG. 3]

FIG. 3 illustrates a functional configuration example of the participant terminal 10 according to the present embodiment. As shown in FIG. 3, the participant terminal 10 according to the present embodiment includes a secret noise generation processing unit 201 and a storage unit 202. For example, the secret noise generation processing unit 201 is implemented through processing for causing the processor 108 to execute one or more programs installed in the participant terminal 10. The storage unit 202 is implemented by, for example, the storage device (memory) such as the auxiliary storage device 107 or the RAM 105.

For the participant terminal 101 of the table creator, the secret noise generation processing unit 201 creates a table T whose elements are integers or real numbers that follow a certain probability distribution, and shuffles and encrypts the elements of the table T. When encrypting the elements of the table T, an encryption key for additive homomorphic encryption is used. Hereinafter, the table T whose elements have been shuffled and encrypted will be referred to as a "table $T_{Enc}$."

On the other hand, for the participant terminal $10_i$ ($i \in \{2, \ldots, m\}$) of the noise generator, the secret noise generation processing unit 201 selects n elements from the table $T_{Enc}$ and calculates the sum as a secret noise. n is a parameter that takes an integer value of at least 1 indicating the number of elements to be selected from the table $T_{Enc}$, and is shared among the participants. However, it is preferable that n be not less than 2.

For the participant terminal 101 of the table creator, the storage unit 202 stores, for example, parameters of probability distribution used when creating the table T, the parameter n, the encryption key of additive homomorphic encryption of the table creator, the table T, the table $T_{Enc}$, and the like.

On the other hand, for the participant terminal $10_i$ ($i \in \{2, \ldots, m\}$) of the noise generator, the storage unit 202 stores, for example, the parameter n, the table T, the table $T_{Enc}$, the secret noise, and the like.

<Secret Noise Generation Processing>

Figure 4:
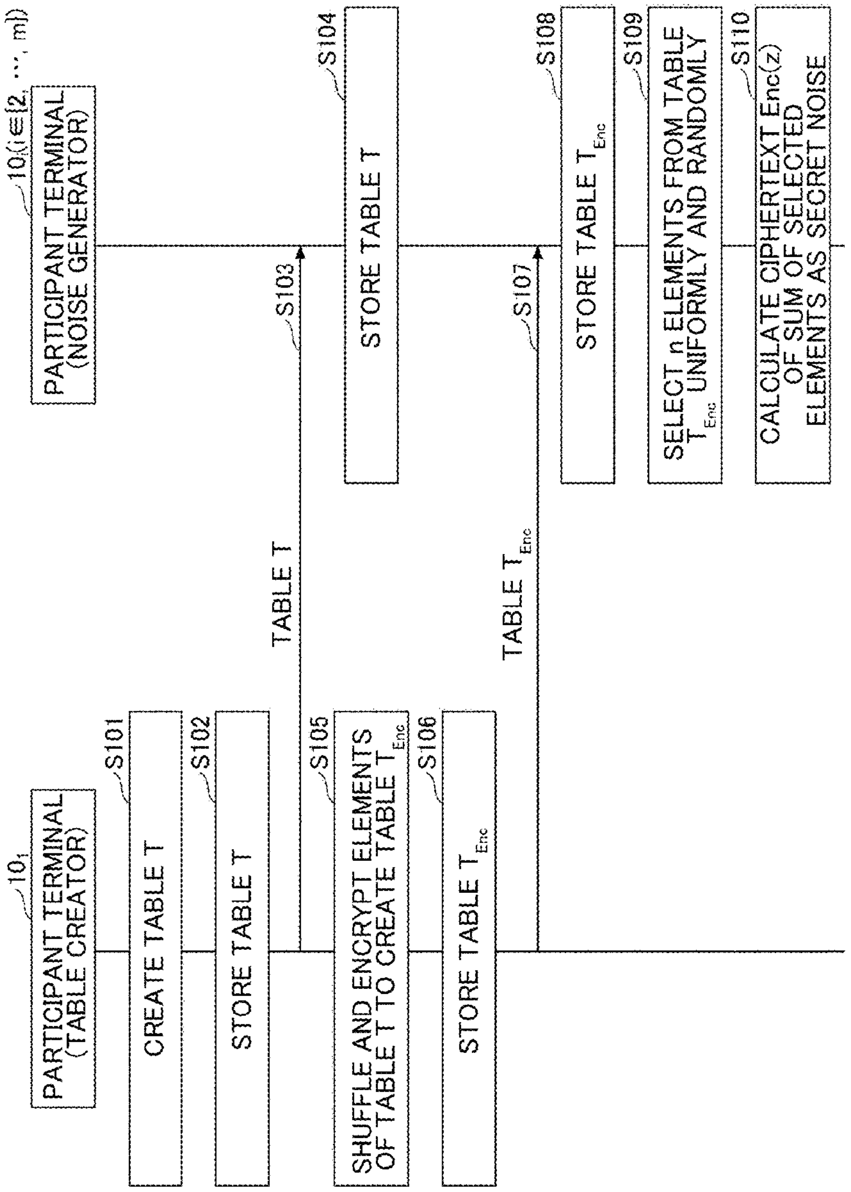
[FIG. 4]

Secret noise generation processing according to the present embodiment will be described with reference to FIG. 4. It is assumed that a parameter n is given to each of participant terminals 10 in advance and is stored in the storage unit 202 of each of the participant terminals 10.

The secret noise generation processing unit 201 of the participant terminal $10_1$ creates a table T whose elements are integers or real numbers that follow a certain probability distribution (step S101). Parameters of the probability distribution may be determined by the participant terminal $10_1$ itself, or may be given to the participant terminal $10_1$. The number of elements in the table T is not particularly limited; for example, the participant terminal $10_1$ itself may decide as appropriate (for example, randomly decide the number of elements in the table T), or the number of elements of the table T may be given to the participant terminal $10_1$.

For example, if a j-th element of the table T is denoted by T[j] and the number of elements is denoted by J, the table T can be expressed as $T=\{T[j] \mid j=1, \ldots, J\}$. In other words, the table T can be implemented as an array with T[j] as the j-th element.

The secret noise generation processing unit 201 of the participant terminal $10_1$ stores the table T created in step S101 in its own storage unit 202 (step S102).

The secret noise generation processing unit 201 of the participant terminal 10; transmits the table T created in step S101 to each participant terminal $10_i$ ($i=\{2, \ldots, m\}$) (step S103).

The secret noise generation processing unit 201 of each participant terminal $\mathbf{10}_i$ (i={2, . . . , m}) stores the table T received from the participant terminal $\mathbf{10}_1$ in its own storage unit 202 (step S104). Accordingly, the table T is shared by the participant terminals 10 of respective participants.

The secret noise generation processing unit 201 of the participant terminal $\mathbf{10}_1$ shuffles the elements of the table T and creates the table $T_{Enc}$ in which all the elements of the shuffled table T are encrypted using an encryption key of additive homomorphic encryption (step S105).

Since shuffle can be represented by, for example, a certain permutation σ on {1, . . . , J}, when the element after shuffling is denoted by T[σ(j)] and data x encrypted using the encryption key of additive homomorphic encryption is denoted by Enc (x), the table $T_{Enc}$ is expressed as $T_{Enc}$={Enc (T[σ(j)])|j=1, . . . , J}.

The secret noise generation processing unit 201 of the participant terminal $\mathbf{10}_1$ stores the table $T_{Enc}$ in its own storage unit 202 (step S106).

The secret noise generation processing unit 201 of the participant terminal $\mathbf{10}_1$ transmits the table $T_{Enc}$ created in step S105 to each participant terminal $\mathbf{10}_i$ (i={2, . . . , m}) (step S107).

The secret noise generation processing unit 201 of each participant terminal $\mathbf{10}_i$ (i={2, . . . , m}) stores the table $T_{Enc}$ received from the participant terminal $\mathbf{10}_1$ in its own storage unit 202 (step S108). Accordingly, the table $T_{Enc}$ is shared by the participant terminals 10 of the respective participants.

The secret noise generation processing unit 201 of the participant terminal $\mathbf{10}_i$ (i={2, . . . , m}) selects n elements uniformly at random from the table $T_{Enc}$ (step S109).

Then, the secret noise generation processing unit 201 of the participant terminal $\mathbf{10}_i$ (i={2, . . . , m}) sets a ciphertext of the sum of n elements selected in step S109 as a secret noise (step S110). In other words, when, for example, n elements, Enc(T[$j_1$]), . . . , Enc(T[$j_n$])∈$T_{Enc}$, are selected in step S109, the secret noise generation processing unit 201 calculates a secret noise Enc (z), which is a ciphertext of a noise z, by Enc(z)=Enc(T[$j_1$])+ . . . +Enc (T[$j_n$]). It satisfies $j_1$, . . . , $j_n$∈{1, . . . , J}. Accordingly, each noise generator can obtain the secret noise (that is, the ciphertext Enc(z) of the noise z).

For example, if a certain noise generator wants to obtain a plurality of secret noises, the participant terminal $\mathbf{10}_i$ of the noise generator may repeat steps S109 to S110 as many times as necessary.

MODIFIED EXAMPLES

Modified Examples of the present invention will be described below.

Modified Example 1

In step S103, the participant terminal $\mathbf{10}_1$ transmits the table T itself to each participant terminal $\mathbf{10}_i$ (i={2, . . . , m}). Alternatively, the participant terminal 101 may transmit a creation algorithm of the table T (or information identifying the algorithm) and the inputs of the algorithm (for example, parameters of the probability distribution that the integers or real numbers as elements of the table T follow) to each participant terminal $\mathbf{10}_i$ (i={2, . . . , m}). As another alternative, if the creation algorithm for the table T is shared among the participants in advance, the participant terminal $\mathbf{10}_1$ may transmit only the inputs of the algorithm to each participant terminal $\mathbf{10}_i$ (i={2, . . . , m}).

Accordingly, the table T is similarly created at each participant terminal $\mathbf{10}_i$ (i={2, . . . , m}), whereby the table T can be shared among the participants.

Modified Example 2

In a case where secure computation other than additive homomorphic encryption is adopted, the plurality of participant terminals 10 may perform the computation when calculating the secret noise in step S110. For example, when using secure computation based on additive secret sharing, the plurality of participant terminals 10 need to perform the computation when calculating the secret noise.

In this case, it is necessary to prevent even the table creator from knowing what values are secured in the elements of $T_{Enc}$. Therefore, when the plurality of participant terminals 10 calculate the secret noise in step S110, for example, it is necessary to calculate the secret noise only by the participant terminal $\mathbf{10}_i$ (i={2, . . . , m}) other than the participant terminal $\mathbf{10}_1$ or it is necessary to, after the table $T_{Enc}$ is created in step S109, shuffle the elements of the table $T_{Enc}$ using the method described in, for example, Reference Literature 1.

Conclusion

As described above, the secret noise generation system 1 according to the present embodiment shuffles and encrypts the elements of the table T having values according to a certain probability distribution as elements, and with secure computation that allows addition of secret values, generates the sum of one or more elements (preferably, two or more elements) of the shuffled and encrypted table $T_{Enc}$ as a secret noise. Accordingly, the secret noise generation system 1 according to the present embodiment can generate a noise (random numbers) whose value cannot be known by all participants with less communication traffic and memory usage as compared to related art.

Therefore, for example, by applying the secret noise generation system 1 according to the present embodiment to a protocol that requires a secret noise, such as differential privacy, it becomes possible to execute the protocol more efficiently.

Advantageous Effects

The secret noise generation system 1 according to the present embodiment mainly has the following advantageous effects (1) to (4).

(1) Anything more about the plaintext noise z than the probability distribution that the noise z follows is not disclosed to all participants until they decode Enc (z). The table creator had no knowledge on which element of the table T was selected to create the noise z, and since the elements of the table $T_{Enc}$ are encrypted, each noise generator does not know what value the element they selected has. Note that each participant can calculate the probability distribution followed by the noise z from the table T and the parameter n.

(2) Since the calculation performed when generating secret noise is addition only, it takes a shorter time per noise.

(3) For example, implementation is easier than in a case where random numbers are generated by performing mathematical conversion or bit array manipulation on uniform random numbers.

(4) When n≥2, a probability distribution that may take an extremely large or small value can be approximated with less communication traffic and memory usage. This is because if the maximum values is S and the minimum value is s in the table T, the maximum value that noise z can take is nS and the minimum value is ns.

The present invention is not limited to the specifically disclosed embodiments, and various modifications, changes, combinations with known techniques can be made without departing from the scope of the claims.

REFERENCE LITERATURE 1

Reference Literature 1: Melissa Chase, Esha Ghosh, and Oxana Poburinnaya. Secret Shared Shuffle. 1340.2019.

REFERENCE SIGNS LIST

1 Secret noise generation system
10 Participant terminal
20 Communication network
101 Input device
102 Display device
103 External I/F
**103*a*** Recording medium
104 Communication I/F
105 RAM
106 ROM
107 Auxiliary storage device
108 Processor
109 Bus
201 Secret noise generation processing unit
202 Storage unit

The invention claimed is:

1. A secret noise generation system comprising:
a first terminal; and
one or more second terminals connected to the first terminal via a communication network,
wherein
the first terminal includes
a first processor, and
a first memory storing first program instructions that cause the first processor to transmit a first table having secret values as a first plurality of elements to each of the second terminals, and
each of the second terminals includes
a second processor, and
a second memory storing second program instructions that cause the second processor to:
select n secret values randomly selected from the first plurality of elements of the first table;
calculate, using secure computation that allows addition of secret values, a sum of selected n secret values; and
generate the secret noise based on the sum of n secret values,
wherein n is an integer not less than 2.

2. The secret noise generation system according to claim 1, wherein the first program instructions cause the first processor to:
create a second table having values according to a predetermined distribution as a second plurality of elements; and
create the first plurality of elements of the first table by shuffling the second plurality of elements of the second table and then encrypting the shuffled second plurality of elements of the second table.

3. The secret noise generation system according to claim 1, wherein the second program instructions cause the second processor to select n secret values uniformly at random from the first table.

4. The secret noise generation system according to claim 1, wherein the secure computation is additive homomorphic encryption or secure computation based on additive secret sharing.

5. The secret noise generation system according to claim 1, wherein the second program instructions cause the second processor to repeat to calculate the secret noise, the second processor to generate a plurality of the secret noises.

6. A secret noise generation method used for a secret noise generation system, the secret noise generation system including a first terminal and one or more second terminals, the method comprising:
transmitting, by the first terminal, a first table having secret values as a first plurality of elements to each of the second terminals;
selecting, n secret values selected from the first plurality of elements of the first table randomly;
calculating, by each of the second terminals, by using secure computation that allows addition of secret values, a sum of selected n secret values selected; and
generating, by each of the second terminals, the secret noise based on the sum of n secret values,
where n is an integer not less than 2.

7. A non-transitory computer-readable recording medium storing a program for causing a computer to perform the secret noise generation method of claim 6.

* * * * *